United States Patent
Ku et al.

(10) Patent No.: US 12,113,193 B2
(45) Date of Patent: Oct. 8, 2024

(54) GREEN SMART FACTORY ENERGY MANAGEMENT SYSTEM FOR CARBON REDUCTION

(71) Applicant: KHAN Workholding Co., Ltd., Changwon-si (KR)

(72) Inventors: Bon Saeng Ku, Changwon-si (KR); Ki Hoon Kim, Changwon-si (KR)

(73) Assignee: KHAN WORKHOLDING CO., LTD., Changwon-si (KR)

( * ) Notice: Subject to any disclaimer, the term of this patent is extended or adjusted under 35 U.S.C. 154(b) by 358 days.

(21) Appl. No.: 17/708,608

(22) Filed: Mar. 30, 2022

(65) Prior Publication Data

US 2023/0318304 A1   Oct. 5, 2023

(51) Int. Cl.
*H01M 16/00*   (2006.01)

(52) U.S. Cl.
CPC ....... *H01M 16/003* (2013.01); *H02J 2300/24* (2020.01); *H02J 2300/28* (2020.01)

(58) Field of Classification Search
CPC .... H02J 3/381; H02J 2300/24; H02J 2300/28; H02J 2300/30; C25B 1/04; G05B 19/042; G05B 2219/2639; H01M 8/04925; H01M 8/0656; H01M 16/003; H01M 2250/10
See application file for complete search history.

(56) References Cited

U.S. PATENT DOCUMENTS

| | | | | |
|---|---|---|---|---|
| 4,486,276 A | * | 12/1984 | Cohn | C25B 1/46 205/524 |
| 2008/0216773 A1 | * | 9/2008 | Kim | H01M 8/0435 122/4 R |
| 2018/0034081 A1 | * | 2/2018 | Gomez | H01M 8/0656 |
| 2019/0067945 A1 | * | 2/2019 | Hierl | H02J 3/46 |

FOREIGN PATENT DOCUMENTS

| | | |
|---|---|---|
| JP | H05-251105 A | 9/1993 |
| JP | 2019-173082 A | 10/2019 |
| KR | 10-1854913 B1 | 5/2018 |
| KR | 10-1999261 B1 | 7/2019 |
| KR | 10-2323235 B1 | 11/2021 |

OTHER PUBLICATIONS

Korean Office Action for related KR Application No. 10-2021-0187323 mailed Feb. 28, 2022 from Korean Intellectual Property Office.

* cited by examiner

*Primary Examiner* — Julio C. Gonzalez
(74) *Attorney, Agent, or Firm* — Paratus Law Group, PLLC

(57) ABSTRACT

A green smart factory energy management system for carbon reduction, includes: an eco-friendly power generator installed on one side of a building to generate first electrical energy through wind power or sunlight; a water electrolysis device for receiving surplus power of the first electrical energy remaining after operating a building, and electrolyzing water to generate hydrogen; a hydrogen storage device for storing some of the hydrogen generated by the water electrolysis device; a hydrogen fuel cell for generating second electrical energy by using some of the hydrogen generated by the water electrolysis device; a machine tool provided with an electrically driven spindle system to grip or rotate a workpiece when the second electrical energy is applied; and a distributed power management device for controlling an amount of power consumed.

5 Claims, 6 Drawing Sheets

GREEN SMART FACTORY ENERGY MANAGEMENT SYSTEM FOR CARBON REDUCTION

BACKGROUND

The present invention relates to a green smart factory energy management system for carbon reduction, and more specifically, to a green smart factory energy management system for carbon reduction, which provides energy generated using wind power and sunlight to a water electrolysis device, and stores hydrogen generated by the water electrolysis device in a hydrogen storage alloy or generates electrical energy from the hydrogen using a hydrogen fuel cell to electrically drive machine tools in a smart factory.

With the development of ICT technologies, efforts are made recently to realize automation of the tasks that are difficult to perform by manpower in conventional factories, as well as the tasks performed by manpower. For example, sensors are attached to various devices in a factory to remotely control and manage the devices, and sensors are installed near the factory to sense and store internal and external environments and construct a database. By implementing such an intelligent smart factory, it is possible to operate the factory more efficiently.

In addition, as the keywords such as 'carbon neutrality' aiming at reducing net emission of carbon to zero by making carbon emission and absorption equal and 'ESG management' aiming at achieving sustainable development through eco-friendliness, socially responsible management, corporate governance improvement and the like are emerged to solve climate change problems globally, there is an urgent need for a technology that can operate a smart factory using eco-friendly energy and manage power efficiently, going beyond a smart factory remotely managed and controlled using a plurality of sensors.

In this regard, patent document 1 (Korean Patent Publication No. 10-1854913) relates to an energy saving system installation service method and a service server, and although appropriate power facilities may be installed according to construction contract details and customer buildings may save energy according thereto, as the installed power facilities are actually operated using fossil fuels including coal, oil, and natural gas, there is a problem in that it only reduces power of buildings and is not greatly helpful in reducing carbon in the aspect of eco-friendliness. Patent document 2 (Korean Patent Publication No. 10-2323235) relates to a method and device for remotely controlling industrial devices of a smart factory, and it is a technique that has not advanced from a first-generation smart factory as mentioned above although it may remotely control the industrial devices of a smart factory.

(Patent Document 1) Korean Patent Publication No. 10-1854913
(Patent Document 2) Korean Patent Publication No. 10-2323235

SUMMARY

Therefore, the present invention has been made in view of the above problems, and it is an object of the present invention to provide a green smart factory energy management system for carbon reduction, which provides energy generated using wind power and sunlight to a water electrolysis device, and stores hydrogen generated by the water electrolysis device in a hydrogen storage alloy or generates electrical energy from the hydrogen using a hydrogen fuel cell to electrically drive machine tools in a smart factory, so as to operate a smart factory using eco-friendly energy and manage power efficiently, going beyond a smart factory remotely managed and controlled using a plurality of sensors.

To accomplish the above object, according to one aspect of the present invention, there is provided a green smart factory energy management system for carbon reduction, the system comprising: an eco-friendly power generator installed on one side of a building to generate first electrical energy through wind power or sunlight; a water electrolysis device for receiving surplus power of the first electrical energy remaining after operating a building, and electrolyzing water to generate hydrogen;
a hydrogen storage device for storing some of the hydrogen generated by the water electrolysis device; a hydrogen fuel cell for generating second electrical energy by using some of the hydrogen generated by the water electrolysis device; a machine tool provided with an electrically driven spindle system to grip or rotate a workpiece when the second electrical energy is applied; and a distributed power management device for controlling an amount of power consumed to control the eco-friendly power generator or to operate the building and an amount of the surplus power supplied to the water electrolysis device according to a generation amount of the first electrical energy, and controlling an amount of power consumed to control the hydrogen fuel cell or to operate the machine tool according to a generation amount of the second electrical energy.

DETAILED DESCRIPTION

Although general terms widely used presently are selected as the terms used in this specification as much as possible in consideration of the functions of the present invention, this may vary according to the intention of those skilled in the art, precedents, advent of new technologies, or the like. In addition, in a specific case, there may be terms arbitrarily selected by an applicant, and in this case, the meaning will be described in detail in the description of the corresponding invention. Therefore, the terms used in the present invention should be defined based on the meaning of the terms and the overall contents of the present invention, rather than simple names of the terms.

Unless otherwise defined, all terms used herein, including technical or scientific terms, have the same meaning as commonly understood by those skilled in the art. Terms such as those defined in a commonly used dictionary should be interpreted as having a meaning consistent with the meaning in the context of the related art, and are not construed in an ideal or excessively formal sense unless explicitly defined in this application.

Figure 1:
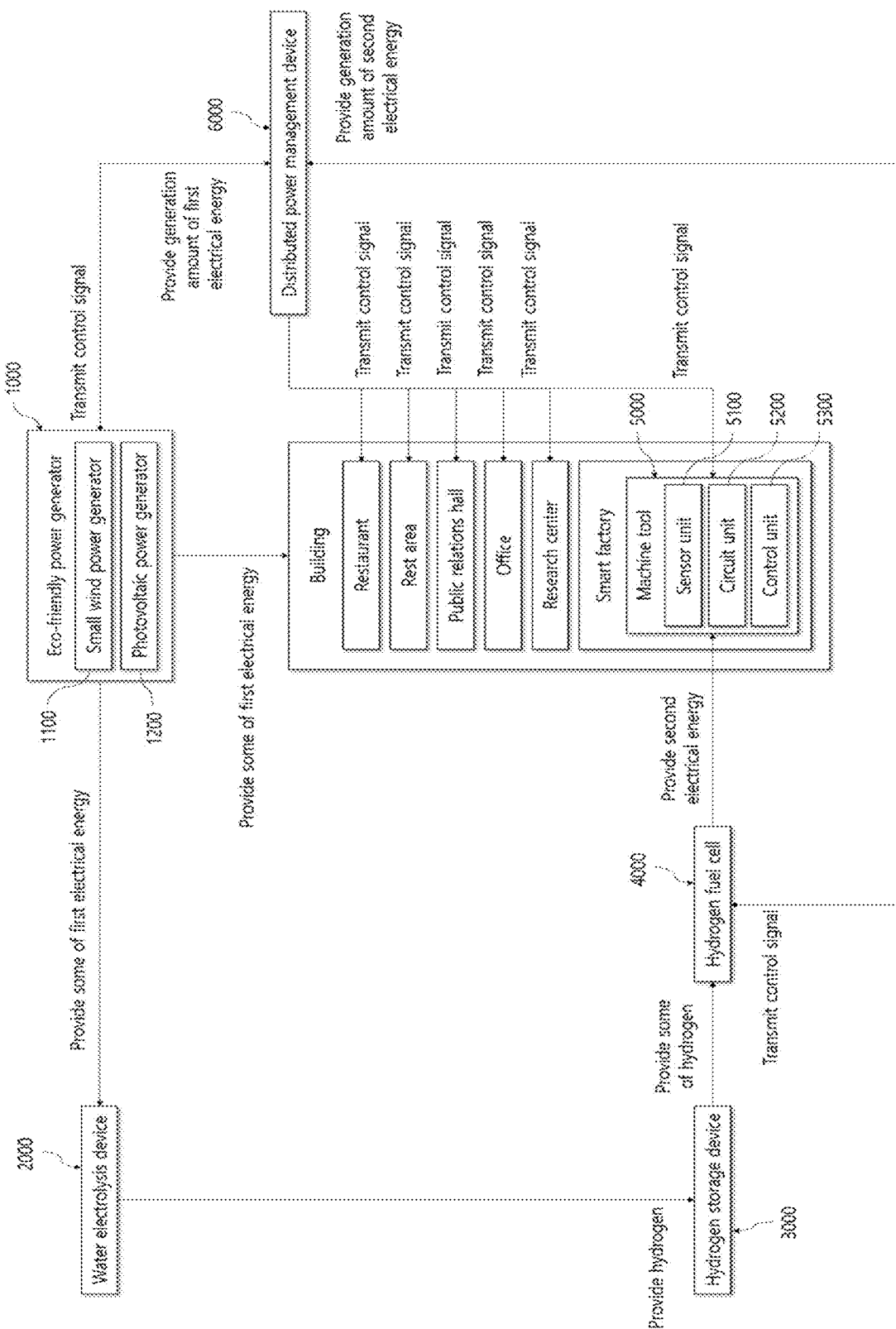
FIG. 1 is a view showing the configuration of a green smart factory energy management system for carbon reduction of the present invention.
Figure 2:
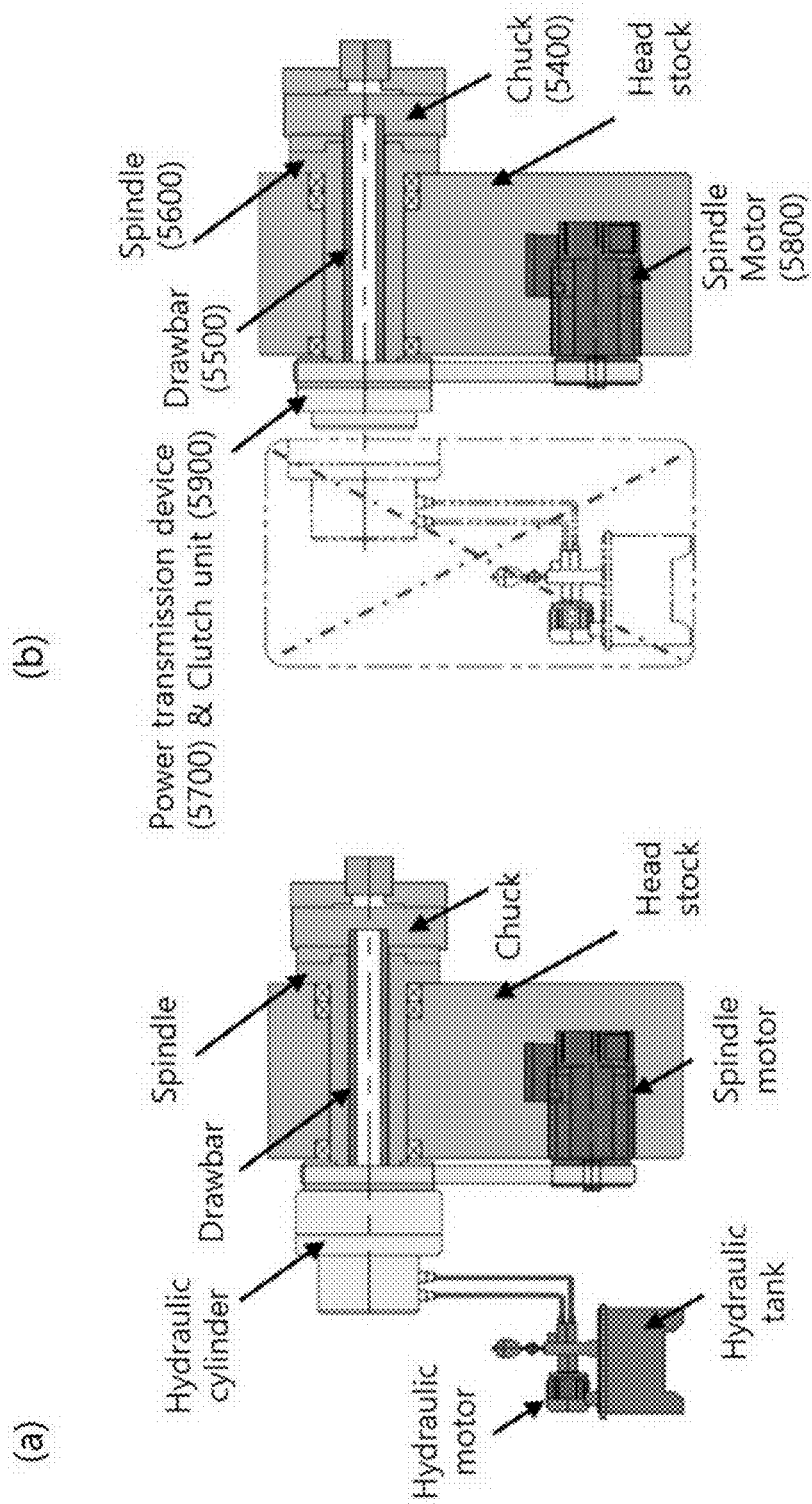
FIG. 2 is a view showing the configuration of a conventional machine tool (a) having a hydraulic system and a machine tool (b) having an electrically driven spindle system according to an embodiment of the present invention.
Figure 3:
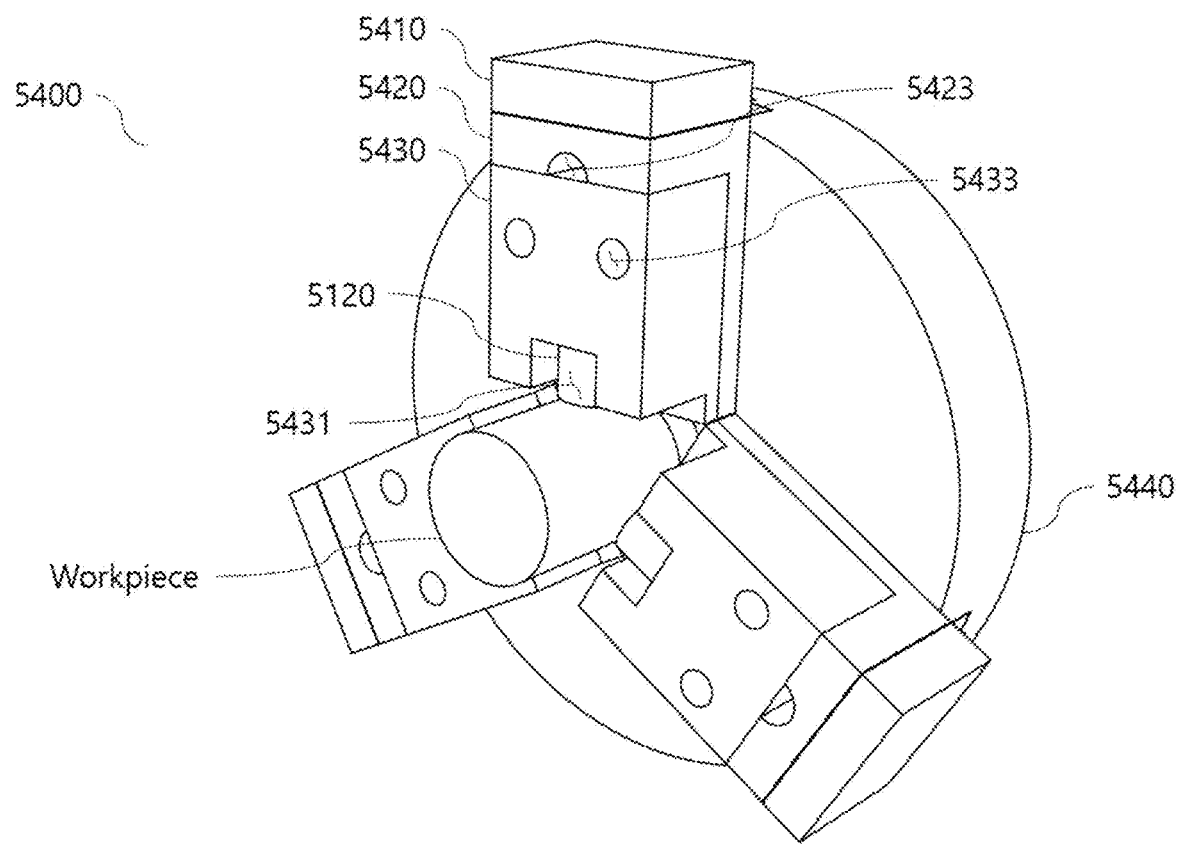
FIG. 3 is a combined perspective view showing the front surface of a chuck according to an embodiment of the present invention.
Figure 4:
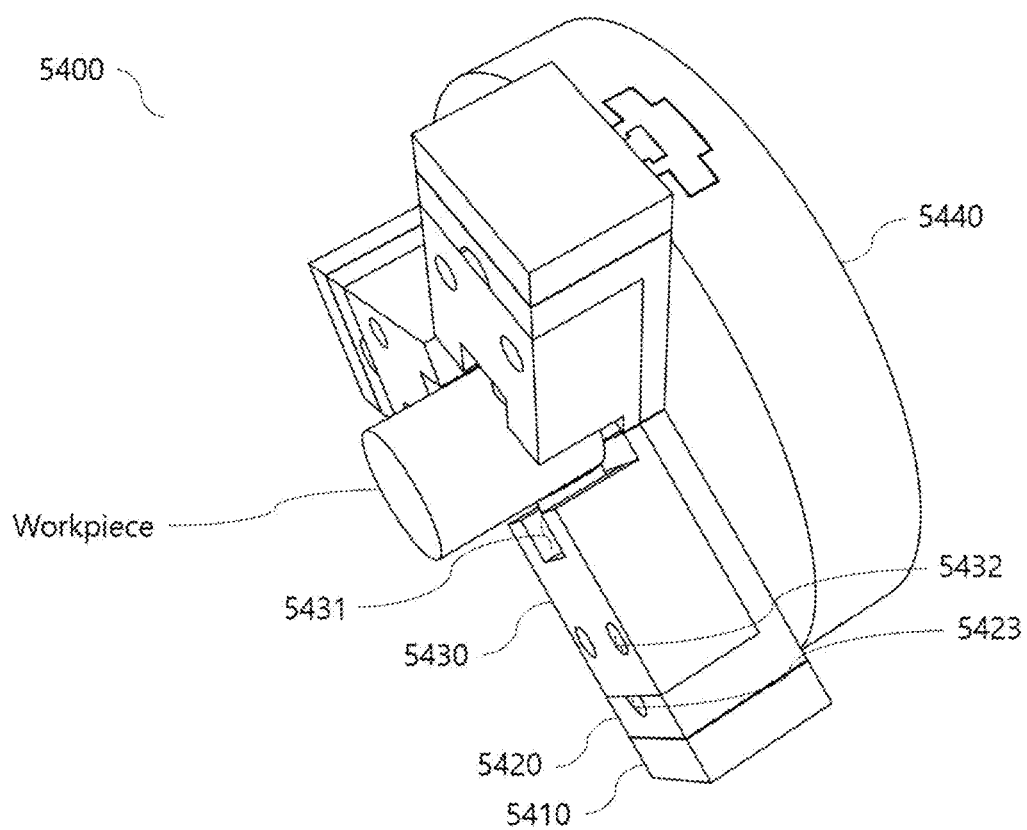
FIG. 4 is a combined perspective view showing a side surface of a chuck body according to an embodiment of the present invention.
Figure 5:
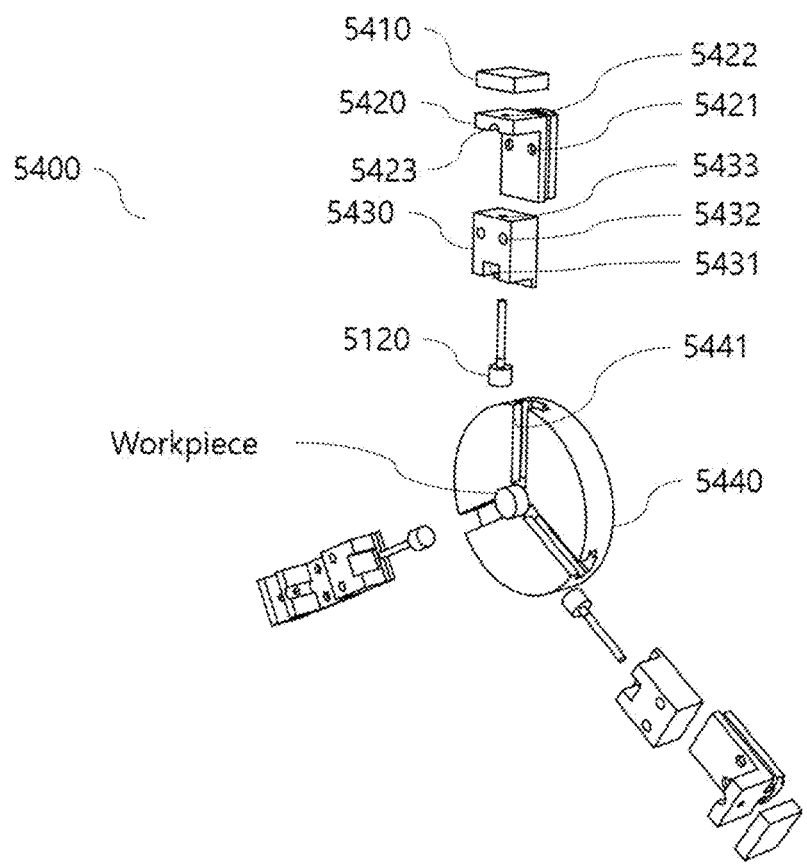
FIG. 5 is an exploded perspective view of a chuck according to an embodiment of the present invention.
Figure 6:
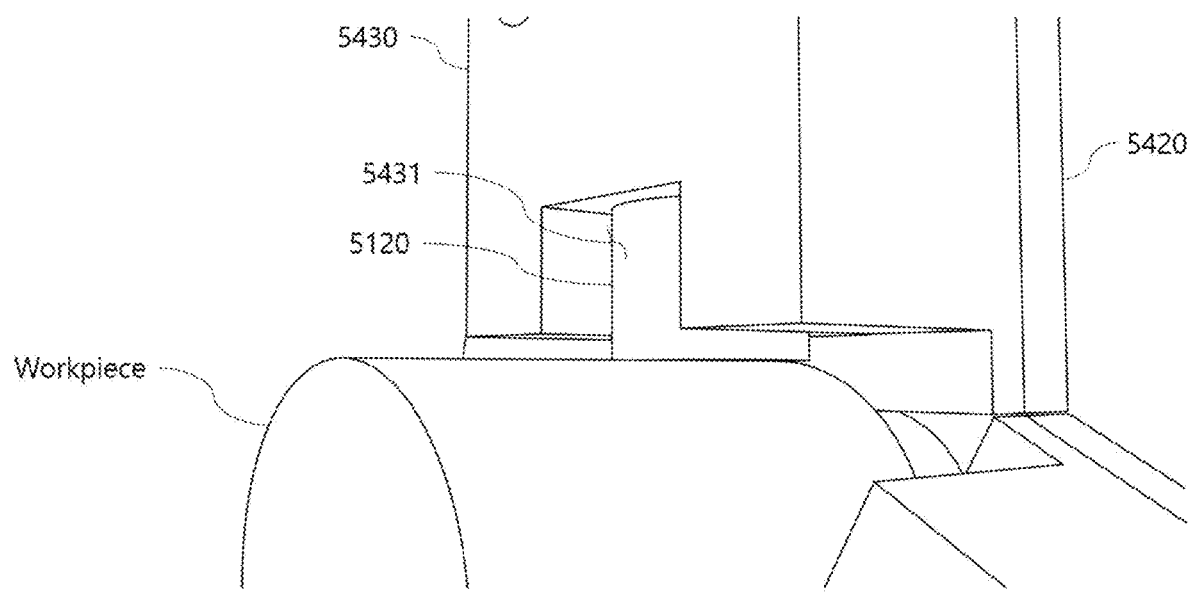
FIG. 6 is an enlarged view showing a workpiece and a load cell contacting each other according to an embodiment of the present invention.

Hereinafter, an embodiment according to the present invention will be described in detail with reference to the accompanying drawings. FIG. 1 is a view showing the configuration of a green smart factory energy management system for carbon reduction of the present invention. FIG. 2 is a view showing the configuration of a conventional machine tool (a) having a hydraulic system and a machine tool 5000 (b) having an electrically driven spindle system according to an embodiment of the present invention. FIG. 3 is a combined perspective view showing the front surface of a chuck 5400 according to an embodiment of the present invention. FIG. 4 is a combined perspective view showing a side surface of a chuck body 5440 according to an embodiment of the present invention. FIG. 5 is an exploded perspective view of a chuck 5400 according to an embodiment of the present invention. FIG. 6 is an enlarged view showing a workpiece and a load cell 5120 contacting each other according to an embodiment of the present invention.

Referring to FIG. 1, the green smart factory energy management system for carbon reduction of the present invention includes an eco-friendly power generator 1000, a water electrolysis device 2000, a hydrogen storage device 3000, a hydrogen fuel cell 4000, a machine tool 5000, and a distributed power management device 6000. Most preferably, all of the components may be installed in one building. For example, the eco-friendly power generator 1000 may be installed on a rooftop to use wind power or sunlight, and the water electrolysis device 2000, the hydrogen storage device 3000, and the hydrogen fuel cell 4000 may be disposed on an arbitrary floor in the building, and the machine tool 5000 may be provided in a smart factory provided on an arbitrary floor, and the distributed power management device 6000 may also be disposed on any floor in the building. Therefore, the present invention has a remarkable effect capable of implementing an intelligent smart factory without carbon emission by producing eco-friendly energy by itself and making efficient energy consumption possible.

More specifically, the eco-friendly power generator 1000 is installed on one side of a building and generates first electrical energy through wind power or sunlight. First, in order to generate the first electrical energy through wind power, the eco-friendly power generator 1000 may include a small wind power generator 1100 having a blade of a carbon material and a rotor of which the blade has a diameter of 4 to 6 meters. Most preferably, the rotor diameter may be 5 meters.

Since a conventional wind power generator includes a rotor of which the blade has a diameter of 7 meters or more and thus is significantly large be installed in a building, it is generally installed in the middle of a mountain or in the sea. However, since the present invention is to generate electrical energy by itself using wind power in the neighborhood of a building, it is most desirable to add a smaller and more efficient mechanical design. That is, the small wind power generator 1100 may increase hardness and reduce weight compared to a conventional one by using a carbon material. In addition, as the rotor diameter is reduced compared to that of the conventional one and an aerodynamic design method is added at the same time, there is a remarkable effect of guaranteeing the same output power although the overall size is reduced.

In addition, the eco-friendly power generator 1000 may further include a photovoltaic power generator 1200 including a plurality of solar cell modules, and a module frame for supporting the plurality of solar cell modules and adjusting the slope. Conventionally, as solar cell modules of a size capable of being installed on the rooftop of a building such as a factory, school, home, or the like is commercialized, the photovoltaic power generator 1200 is not different from the conventional one.

In addition, the small wind power generator 1100 and the photovoltaic power generator 1200 may generate about 50% of the total power required by the green smart factory energy management system for carbon reduction of the present invention. However, wind power and sunlight are significantly limited by natural phenomena. For example, since there are many variables such as windless day, rainy day, cloudy day without enough sunlight, and the like, when the generators are responsible for generating the total power required in the present invention, a serious situation incapable of supplying power to the entire building may occur when the stored electrical energy is not enough. Therefore, it is most desirable to distribute energy sources to prevent such a situation.

In addition, the eco-friendly power generator 1000 may provide only as much power as needed, rather than providing all the generated first electrical energy, to a building, and provide remaining surplus power to the water electrolysis device 2000 to generate, through hydrogen, about 50% of the total power required by the green smart factory energy management system for carbon reduction of the present invention.

Next, the water electrolysis device 2000 receives the surplus power of the first electrical energy remaining after operating the building, and electrolyzes water to generate hydrogen. The water electrolysis device 2000 may electrolyze water by implementing a non-catalyst membrane method using an NCM electrode (Non-Catalyst Membrane Cell) and a potassium hydroxide (KOH) aqueous electrolyte.

Here, the NCM electrode may be provided between one anode and two cathodes, and when water flows into the anode, a hydrogen evolution reaction and an oxygen evolution reaction may occur. Then, hydrogen may be released to the two cathodes, and oxygen may be released to the one anode.

The water electrolysis device 2000 has an excellent anti-oxidation effect and thus has high durability, and is easier to maintain than a conventional one. In addition, although a conventional hydrogen generator uses a platinum catalyst and a separation membrane, the water electrolysis device 2000 of the present invention may be used semi-permanently within a range of to 50 degrees by using a non-catalytic water electrolysis method, and has a remarkable effect of reducing use of the surplus power provided from the eco-friendly power generator 1000 since the power used for electrolysis is reduced and the voltage is increased as the current flow is smooth.

Next, the hydrogen storage device 3000 stores some of the hydrogen generated by the water electrolysis device 2000. The hydrogen storage device 3000 may store the hydrogen in a magnesium-based hydrogen storage alloy in units of hydrogen electrons so that the hydrogen may be stored in a solid form. The hydrogen storage device 3000 may be provided to continuously store some of the hydrogen generated by the water electrolysis device 2000 in case where hydrogen is not supplied from the water electrolysis device 2000 that does not receive the surplus power from the eco-friendly power generator 1000.

Most preferably, the magnesium-based hydrogen storage alloy may be of two types including magnesium nickel (MgNi) and magnesium hydride (MgH2). The hydrogen storage alloy formed of magnesium nickel (MgNi) may store hydrogen in units of hydrogen electrons in a method of alloying after dissolving metal by VIM electro-vacuum melting. In addition, the hydrogen storage alloy formed of magnesium hydride (MgH2) may directly store hydrogen in magnesium.

Although the storage capacity is about 2.0 wt % in the prior art as a titanium (Ti)-based hydrogen storage alloy is used, as the hydrogen storage device 3000 is formed of a magnesium-based hydrogen storage alloy, the storage capacity may be within a range of 5 to 15 wt %. In the prior art, as the hydrogen is stored in a state of hydrogen gas at an ultra-high pressure of about 700 bar at room temperature, the possibility of explosion is considerably high, and a large site area is required for installation. However, since the hydrogen storage device 3000 of the present invention stores hydrogen in a solid form, the hydrogen may be stored at room temperature at a normal pressure of 10 bar or lower. In addition, since it can be installed in a compact place of 10 Pyeong (3.3 m$^2$/Pyeong) or smaller, there is a remarkable effect in that the hydrogen storage device 3000 can be installed anywhere in a building.

Next, the hydrogen fuel cell 4000 generates second electrical energy by using some of the hydrogen generated by the water electrolysis device 2000. The hydrogen fuel cell 4000 may generate DC power using the hydrogen, and convert the DC power into AC current to be used in the machine tool 5000.

Next, the machine tool 5000 is provided with an electrically driven spindle system to grip or rotate a workpiece when the second electrical energy is applied. Most preferably, the machine tool 5000 is a CNC lathe, and this may process a workpiece by rotating after fixing it.

Referring to FIG. 2(*a*), the conventional CNC lathe requires independent driving systems to drive the drawbar and the spindle, and it is general that a hydraulic system is applied as the drawbar, and an electric system is applied as the spindle. In the conventional hydraulically operated drawbar, a hydraulic driving unit including a hydraulic tank, a hydraulic motor, and a hydraulic cylinder is quite complicated, and heat, noise, vibration, and rattling according to hydraulic pressure are generated. For example, the heat generated while the hydraulic driving unit continuously operates is transferred to the drawbar and the spindle and causes deformation to deteriorate the quality of the workpiece and increase of temperature inside the factory to reduce energy efficiency. In addition, the vibration generated while the hydraulic driving unit continuously operates generates cutting resistance and causes severe wear and frequent replacement of the cutting tool. In addition, since hydraulic pressure should be continuously generated, when the hydraulic driving unit is used, in order to maintain the clamping force, which is the force of the chuck for holding the workpiece, energy efficiency is considerably low, and there is a technical limitation of not being able to finely control the clamping force.

In order to solve this problem, the conventional hydraulic driving unit is removed from the machine tool 5000 of the present invention. However, as a power transmission device 5700 and a clutch unit 5900 can be electrically driven instead in the machine tool 5000 according to numerical values input through the electrically driven spindle system, there is a remarkable effect of increasing control accuracy and reliability compared to the conventional one. In addition, as the conventional hydraulic driving unit is removed, the machine tool 5000 is smaller in volume and weight compared to the conventional one and thus may maintain the quality of the workpiece constant without being restricted by the installation location, and does not affect the temperature inside the factory. In addition, it may enhance energy efficiency of the entire factory in which numerous machine tools 5000 are disposed, and there is a remarkable effect of extending the replacement cycle of cutting tools due to the reduced vibration and increasing the time capable of producing workpieces.

In addition, since the machine tool 5000 is provided with an electrically driven spindle system, it does not need to replace the hydraulic oil of the conventional hydraulic driving unit or to process waste oil, so that it is more eco-friendly. In addition, since the second electrical energy is provided by the hydrogen fuel cell 4000 to the electrically driven spindle system of the machine tool 5000, it is harmless to the environment and has a remarkable effect of realizing carbon-neutral management although the machine tool 5000 operates for 24 hours.

Describing the machine tool 5000 of the present invention in more detail with reference to FIG. 2(*b*), the machine tool 5000 may include a chuck 5400 for fixing a workpiece, a drawbar 5500 for driving the chuck 5400, a spindle 5600 for rotating all of the chuck 5400, the drawbar 5500, and the workpiece, a power transmission device 5700 for transmitting power to rotate the spindle 5600, a spindle motor 5800 engaged with the power transmission device 5700 to generate power, a clutch unit 5900 selectively connecting the spindle 5600 to the power transmission device 5700, a sensor unit 5100 provided on one side to facilitate fusion of the mechanical mechanism of the electrically driven spindle system and a Numerical Control (NC) system, a circuit unit 5200 electrically connected to the sensor unit 5100 to receive a sensing signal, and a control unit 5300 for controlling operation of at least one among the chuck 5400, the drawbar 5500, the spindle 5600, the power transmission device 5700, the spindle motor 5800, and the clutch unit 5900 according to the sensing signal transmitted through the circuit unit 5200.

In addition, the control unit 5300 may transmit a control signal to perform a clamping mode in which the chuck 5400 and the spindle 5600 are in a fixed state and the workpiece is gripped by linear transfer of the drawbar 5500, a spindle mode in which the chuck 5400, the spindle 5600, the drawbar 5500, and the workpiece rotate in a state of being connected after the clamping mode, and an unclamping mode in which the drawbar 5500 is linearly transferred again to release gripping of the work piece. That is, the control unit 5300 may perform the clamping mode, the spindle mode, and the unclamping mode respectively by obtaining the sensing signal sensed by the sensor unit 5100 through the circuit unit 5200, determining a state of each component through the sensing signal, and transmitting a control signal to each component through the circuit unit 5200.

Describing the three modes in more detail, the clamping mode is for performing an operation of gripping the workpiece, and the control unit 5300 may first confirm initial conditions of the clamping mode. The initial conditions of the clamping mode may include whether the position of the drawbar 5500 is in an unclamping section, whether the clutch unit 5900 is in an unclamping state, whether an orientation work for recognizing the origin of the spindle has been performed, a driving range of the chuck 5400, whether a clamping point is measured, whether a thrust to be applied to the workpiece is input as a normal value within the driving range. When at least one of the initial conditions of the clamping mode is not satisfied, the control unit 5300 may provide an alarm to reset and reconfirm the initial conditions for the clamping mode.

In addition, when all the initial conditions of the clamping mode are satisfied, the control unit 5300 may transmit a control signal to the linear motor 5510 through the circuit unit 5200 so that the drawbar 5500 may be transferred. The linear motor 5510 is installed on one side of the drawbar 5500 to provide thrust so that the drawbar 5500 may be transferred forward or backward according to the clamping direction of the workpiece. At this point, torque according to the thrust may be generated. After the drawbar 5500 is transferred, the control unit 5300 may receive a sensing signal sensed by the sensor unit 5100 through the circuit unit 5200.

According to an embodiment, the sensor unit 5100 may be a linear sensor 5110 installed on one side of the drawbar 5500, and the sensing signal is a signal sensing a degree of change in the distance of the drawbar 5500 receiving the thrust of the linear motor 5510 and transferred forward or backward. The control unit 5300 may confirm in order whether a critical position of the drawbar 5500 is reached and whether a critical torque is reached on the basis of the sensing signal. When the drawbar 5500 reaches the critical position and the critical torque, the control unit 5300 may calculate and store an angle capable of coupling the clutch unit 5900 on the basis of the current angle of the power transmission device 5700 stored when the clamping is driven, and transmit a control signal so that the clutch unit 5900 may be coupled to the power transmission device 5700 when the pneumatic pressure is released after the power transmission device 5700 is positioned at a right place at an angle capable of coupling. Then, finally, the control unit 5300 may switch the clamping mode to the spindle mode and terminate the clamping mode.

However, according to an embodiment of the present invention, as the clamping force applied to the workpiece is estimated on the basis of correlation or the like using the degree of change in the distance of the drawbar 5500, there is a technical limitation of not being able to confirm an accurate clamping force. When a clamping force greater than a reference value is applied to the workpiece, it is difficult to precisely process the workpiece as a bending phenomenon occurs and thus irregularities are generated on the processing surface. In the opposite case as well, when a clamping force lower than a reference value is applied to the workpiece, it is difficult to precisely process the workpiece as vibration and noise are generated when the workpiece rotates and thus irregularities are generated on the surface.

According to another embodiment, the sensor unit 5100 may be a load cell 5120 disposed on one side of the chuck 5400. In addition, the chuck 5400 includes a sensor fixing jaw 5430 for fixing the load cell 5120 to be in contact with the workpiece, a support jaw 5420 allowing the sensor fixing jaw 5430 to be connected to a chuck body 5440, and a circuit unit housing 5410 including a circuit unit 5200 therein and accommodating the circuit of the load cell 5120, and may directly sense the clamping force applied to the workpiece.

Referring to FIGS. 3 to 4, a base groove 5441 formed in the shape of a hollow cylinder may be provided on one side of the chuck body 5440 so that the support jaw 5420 may be engaged in a sliding manner. In addition, the support jaw 5420 engaged in a sliding manner may be additionally fixed in a screw tightening method or a stopper method so as not to be separated due to a strong rotational force. In addition, a plurality of the base grooves 5441 may be formed on one side of the chuck body 5440 at regular intervals. For example, three base grooves 5441 may be provided at intervals of 120 degrees. In addition, the support jaw 5420 may be engaged in each of the three base grooves 5441. That is, the number of the base grooves 5441 and the number of the support jaws 5420 are the same. In addition, as the support jaw 5420 includes a disengagement groove 5423 formed in the shape of a semicircle, there is a remarkable effect in that it is easy to disengage the load cell 5120 and the sensor fixing jaw 5430, and conduct maintenance accompanied due to sensor failure or the like.

In addition, referring to FIG. 5, the sensor fixing jaw 5430 may be engaged with the support jaw 5420, and at least one among a sliding method and a screw tightening method may be adopted as an engagement method. For the screw tightening method, the sensor fixing jaw 5430 and the support jaw 5420 may be provided with first screw holes 5421 and second screw holes 5432 having the same central axis, respectively. The number of the sensor fixing jaws 5430 is the same as the number of the support jaws 5420. In addition, the load cell 5120 may be provided within the number of the sensor fixing jaws 5430. For example, when there are three sensor fixing jaws 5430, one, two, or three load cells 5120 may be provided. Most preferably, one load cell 5120 may be provided in an arbitrary sensor fixing jaw 5430.

At this point, the circuit unit housing 5410 may be provided on the top of the support jaw 5420 provided with the load cell 5120. Meanwhile, the circuit unit 5200 provided in the circuit unit housing 5410 may include a battery for wireless driving, an amplifier for amplifying the sensing signal obtained from the load cell 5120, an ADC converter for converting the amplified sensing signal from an analog form into a digital form, and a wireless transmission unit for wirelessly transmitting the sensing signal converted into the digital form to a receiving unit disposed to be adjacent to the Numerical Control (NC) system.

In addition, referring to FIG. 5, the support jaw 5420 and the sensor fixing jaw 5430 may be provided with a first circuit hole 5422 and a second circuit hole 5433 having the same central axis respectively so that a circuit connected to one side of the load cell 5120 may be connected to the circuit unit 5200. The circuit of the load cell 5120 passing through the first circuit hole 5422 and the second circuit hole 5433 may reach inside the circuit unit housing 5410 to be directly connected to the circuit unit 5200.

In addition, most preferably, the load cell 5120 may be inserted into an insertion hole 5431 provided at the bottom center of the surface facing the workpiece in the sensor fixing jaw 5430. Accordingly, there is a remarkable effect of intuitively sensing the clamping force applied to the workpiece as the workpiece is inserted into the chuck body 5440 and gripped. That is, the sensing signal sensed by the load cell 5120 may be transmitted to the receiving unit through the circuit unit 5200 in a wireless communication method, and the receiving unit may transmit the sensing signal to the Numerical Control (NC) system in a wired or wireless communication method. Then, when the clamping force is within a preset threshold range, the Numerical Control (NC) system that has acquired the sensing signal may determine that an appropriate clamping force is applied to the workpiece, and when the clamping force is lower than or larger than the preset threshold range on the contrary, the Numerical Control (NC) system may determine that the clamping force is inappropriately applied to the workpiece, and transmit a control signal so that the linear motor 5510 may increase or decrease the torque. This process may be repeated until the clamping force falls within the preset threshold range. Most preferably, the preset threshold range may be a range of ±0.1 kN. When the clamping force falls within a preset threshold range through the iterative process as described above, the control unit 5300 may calculate and store an angle capable of coupling the clutch unit 5900 on the basis of the current angle of the power transmission device 5700 stored when the clamping is driven, and transmit a control signal so that the clutch unit 5900 may be coupled to the power transmission device 5700 when the pneumatic pressure is released after the power transmission device 5700 is positioned at a right place at an angle capable of coupling. Then, finally, the control unit 5300 may switch the clamping mode to the spindle mode and terminate the clamping mode.

Therefore, according to this embodiment of the present invention, as the clamping force applied to the workpiece is directly sensed using the load cell 5120 as shown in FIG. 6, there is a remarkable effect of more precisely processing the workpiece than in the prior art.

Next, the spindle mode is for performing an operation of rotating and cutting the workpiece, and the control unit 5300 may first confirm initial conditions of the spindle mode. The clamping mode should be preempted to perform the spindle mode. Here, the initial conditions of the spindle mode may include whether the position of the drawbar 5500 is in a clamping section and whether the clutch unit 5900 is in the clamping state. When at least one of the initial conditions of the spindle mode is not satisfied, the control unit 5300 may provide an alarm to reset and reconfirm the initial conditions for the spindle mode.

Then, when all the initial conditions of the spindle mode are satisfied, the control unit 5300 may transmit a control signal to the spindle motor 5800 through the circuit unit 5200 so that the chuck 5400, the spindle 5600, the drawbar 5500, and the workpiece may rotate in a state of being connected.

Next, after the rotation operation is completed, the control unit 5300 may move the clutch unit 5900 at a previously stored clutch coupling angle through orientation driving in order to switch back the clutch unit 5900 from the spindle mode to the unclamping mode. Then, the control unit 5300 may transmit a control signal to the linear motor 5510 through the circuit unit 5200 to return the drawbar 5500 as much as the stroke of the drawbar 5500. At this point, the drawbar 5500 may be transferred forward or backward according to the unclamping direction of the workpiece. Then, the control unit 5300 may receive the sensing signal sensed by the sensor unit 5100 through the circuit unit 5200 after the drawbar 5500 is transferred. At this point, when the critical torque and the critical position of the linear motor 5510 are confirmed, the control unit 5300 may terminate driving of the linear motor 5510, and transmit a control signal for releasing coupling of the power transmission device 5700 and the clutch unit 5900. In addition, the control unit 5300 may initialize all numerical values and terminate the unclamping mode.

Next, the distributed power management device 6000 controls an amount of power consumed to control the eco-friendly power generator 1000 or to operate a building and an amount of surplus power supplied to the water electrolysis device 2000 according to the generation amount of the first electrical energy, and controls an amount of power consumed to control the hydrogen fuel cell 4000 or to operate the machine tool 5000 according to the generation amount of the second electrical energy.

Generally, a distributed power source refers to a small-scale power generation facility using renewable energy resources such as sunlight or wind power to simplify power distribution facilities of inter-regional or intra-regional power transmission networks and increase efficiency of the power distribution facilities. In the present invention, since 50% of total amount of power used in a building is provided by the eco-friendly power generator 1000 including the small wind power generator 1100 and the photovoltaic power generator 1200, and the remaining 50% of the total amount of power is provided by the hydrogen fuel cell 4000, it may be referred to as a distributed power source.

That is, the distributed power management device 6000 may be provided to efficiently use the energy generated by the distributed power source. More specifically, it may control the eco-friendly power generator 1000 according to the generation amount of the first electrical energy. For example, when the amount of energy generated by the photovoltaic power generator 12000 is small, the photovoltaic power generator 1200 may transmit a control signal to rotate the support frame in consideration of the incident angle of sunlight. In addition, some of the first electrical energy is used to operate a building, and the rest is provided to the water electrolysis device 2000 as surplus power. The distributed power management device 6000 may turn on/off provision of the some of the first electrical energy to the building for each floor or machine, and may turn on/off provision of the surplus power according to failure of the water electrolysis device 2000 or storage capacity of the hydrogen storage device 3000.

In addition, when the generation amount of the second electrical energy generated by the hydrogen fuel cell 4000 is enough to generate a large amount of surplus power even after operating the machine tool 5000, the distributed power management device 6000 may turn off the hydrogen fuel cell 4000. In addition, it may turn on/off provision of the second electrical energy to the machine tool 5000.

According to the present invention as described above, as the green smart factory energy management system provides energy generated using wind power and sunlight to the water electrolysis device 2000, and stores hydrogen generated by the water electrolysis device 2000 in a hydrogen storage alloy or generates electrical energy from the hydrogen using the hydrogen fuel cell 4000 to electrically drive the machine tool 5000 in a smart factory, there is a remarkable effect of operating the smart factory using eco-friendly energy and efficiently managing power, going beyond a smart factory remotely managed and controlled using a plurality of sensors.

In addition, as the present invention includes a machine tool 5000 having an electrically driven spindle system, there is an effect of significantly reducing energy consumed during operation, extending lifespan of the machine, and improving accuracy and reliability of control.

In addition, as the present invention is provided with a load cell in a chuck that grips a workpiece in a machine tool having an electrically driven spindle system, there is an effect of directly sensing a clamping force applied to the workpiece in the clamping mode without estimation, and processing the workpiece more precisely.

The effects of the present invention are not limited to the effects mentioned above, and other unmentioned effects will be clearly understood by those skilled in the art from the detailed description and description of the claims.

The embodiments may be implemented in hardware, software, firmware, middleware, microcode, hardware description language, or any a combination thereof. When the embodiments are implemented in software, firmware, middleware, or microcode, a program code or code segments performing necessary tasks may be stored in a computer-readable storage medium and executed by one or more processors.

In addition, the aspects of the subject matters described in this specification may be described in the general context of computer-executable instructions, such as program modules or components executed by a computer. Generally, the program modules or components include routines, programs, objects, and data structures that perform specific tasks or implement specific data types. The aspects of the subject matters described in this specification may be embodied in distributed computing environments where tasks are performed by remote processing devices linked through communications networks. In a distributed computing environment, the program modules may be located in both local and remote computer storage media including memory storage devices.

Although the embodiments have been described as described above with reference to the limited embodiments and drawings, those skilled in the art may make various changes and modifications from the above descriptions. For example, although the described techniques are performed in an order different from that of the described method, and/or although the components of the systems, structures, devices, circuits, and the like described above are coupled or combined in a manner different from those of the methods described above, or replaced or substituted by other components or equivalents, appropriate results may be achieved.

Therefore, other implementations, other embodiments, and equivalents to the claims are also within the scope of the claims described below.

DESCRIPTION OF SYMBOLS

1000: Eco-friendly power generator
1100: Small wind power generator
1200: Photovoltaic power generator
2000: Water electrolysis device
3000: Hydrogen storage device
4000: Hydrogen fuel cell
5000: Machine tool
5100: Sensor unit
5110: Linear sensor
5120: Load cell
5200: Circuit unit
5300: Control unit
5400: Chuck
5410: Circuit unit housing
5420: Support jaw
5421: First screw hole
5422: First circuit hole
5423: Disengagement groove
5430: Sensor fixing jaw
5431: Insertion hole
5432: Second screw hole
5433: Second circuit hole
5440: Chuck body
5441: Base groove
5500: Drawbar
5510: Linear motor
5600: Spindle
5700: Power transmission device
5800: Spindle motor
5900: Clutch unit
6000: Distributed power management device

What is claimed is:

1. A green smart factory energy management system for carbon reduction, the system comprising:
an eco-friendly power generator installed on one side of a building to generate first electrical energy through wind power or sunlight;
a water electrolysis device for receiving surplus power of the first electrical energy remaining after operating a building, and electrolyzing water to generate hydrogen;
a hydrogen storage device for storing some of the hydrogen generated by the water electrolysis device;
a hydrogen fuel cell for generating second electrical energy by using some of the hydrogen generated by the water electrolysis device;
a machine tool provided with an electrically driven spindle system to grip or rotate a workpiece when the second electrical energy is applied; and
a distributed power management device for controlling an amount of power consumed to control the eco-friendly power generator or to operate the building and an amount of the surplus power supplied to the water electrolysis device according to a generation amount of the first electrical energy, and controlling an amount of power consumed to control the hydrogen fuel cell or to operate the machine tool according to a generation amount of the second electrical energy,
wherein the machine tool includes:
a chuck for fixing a workpiece;
a drawbar for driving the chuck;
a spindle for rotating all of the chuck, the drawbar, and the workpiece;
a power transmission device for transmitting power to rotate the spindle;
a spindle motor engaged with the power transmission device to generate power;
a clutch unit selectively connecting the spindle to the power transmission device;
a sensor unit provided on one side to facilitate fusion of the mechanical mechanism of the electrically driven spindle system and a Numerical Control (NC) system;
a circuit unit electrically connected to the sensor unit to receive a sensing signal; and
a control unit for controlling operation of at least one among the chuck, the drawbar, the spindle, the power transmission device, the spindle motor, and the clutch unit according to the sensing signal transmitted through the circuit unit, wherein
the control unit transmits a control signal to perform
a clamping mode in which the chuck and the spindle are in a fixed state and the workpiece is gripped by linear transfer of the drawbar,
a spindle mode in which the chuck, the spindle, the drawbar, and the workpiece rotate in a state of being connected after the clamping mode, and
an unclamping mode in which the drawbar is linearly transferred again to release gripping of the work piece.

2. The system according to claim 1, wherein the eco-friendly power generator includes a small wind power generator having a blade of a carbon material and a rotor of which the blade has a diameter of 4 to 6 meters.

3. The system according to claim 1, wherein the water electrolysis device electrolyzes water by implementing a non-catalyst membrane method using an NCM electrode (Non-Catalyst Membrane Cell) and a potassium hydroxide (KOH) aqueous electrolyte.

4. The system according to claim 1, wherein the hydrogen storage device stores the hydrogen in a magnesium-based hydrogen storage alloy in units of hydrogen electrons so that the hydrogen may be stored in a solid form.

5. The system according to claim 1, wherein the chuck includes: a sensor fixing jaw for fixing a load cell to be in contact with the workpiece, support jaw allowing the sensor fixing jaw to be connected to a chuck body and a circuit unit housing including the circuit unit therein and accommodating a circuit of the load cell, and directly senses a clamping force applied to the workpiece.

* * * * *